(12) United States Patent
Ament et al.

(10) Patent No.: US 6,183,028 B1
(45) Date of Patent: Feb. 6, 2001

(54) SAFETY NET SYSTEM WITH LOAD INDICATOR

(75) Inventors: Eduard Ament, Aichwald; Marina Ehrenberger, Esslingen; Holger Seel, Aidlinger, all of (DE)

(73) Assignee: BOS GmbH & Co. KG

(*) Notice: Under 35 U.S.C. 154(b), the term of this patent shall be extended for 0 days.

(21) Appl. No.: 09/462,219

(22) PCT Filed: Jul. 1, 1998

(86) PCT No.: PCT/DE98/01818

§ 371 Date: Jan. 3, 2000

§ 102(e) Date: Jan. 3, 2000

(87) PCT Pub. No.: WO99/01316

PCT Pub. Date: Jan. 14, 1999

(30) Foreign Application Priority Data

Jul. 4, 1997 (DE) .............................. 197 28 587

(51) Int. Cl.⁷ .................................................. B60R 21/06
(52) U.S. Cl. ...................... 296/24.1; 296/37.16; 280/749
(58) Field of Search ................. 296/24.1, 37.8, 296/37.16; 280/749, 748

(56) References Cited

U.S. PATENT DOCUMENTS

| | | |
|---|---|---|
| 4,482,137 | 11/1984 | Gavagan et al. . |
| 5,427,486 | 6/1995 | Green . |
| 5,437,474 * | 8/1995 | Ament ................................ 280/749 |
| 5,551,726 * | 9/1996 | Ament ................................ 280/749 |
| 5,695,217 * | 12/1997 | Ament et al. ...................... 280/749 |
| 5,820,187 * | 10/1998 | Ament et al. ...................... 296/24.1 |
| 5,876,064 * | 3/2000 | Ament et al. ...................... 280/749 |
| 5,954,380 * | 9/2000 | Ament et al. ...................... 296/24.1 |

FOREIGN PATENT DOCUMENTS

| | | |
|---|---|---|
| 40 10 209 | 10/1991 | (DE) . |
| 42 39 470 A1 | 5/1994 | (DE) . |
| 43 36 380 | 4/1995 | (DE) . |
| WO 91/12155 | 8/1991 | (WO) . |

* cited by examiner

*Primary Examiner*—D. Glenn Dayoan
*Assistant Examiner*—Patricia Engle
(74) *Attorney, Agent, or Firm*—Leydig, Voit & Mayer, Ltd.

(57) ABSTRACT

A safety net arrangement is provided with a load-indicating arrangement (25) in order to signal to the user that forces have acted on the safety net which possibly can lead to a prior damage. The load-indicating arrangement (25) cooperates with the anchoring members (21) with which the front edge of the safety net is to be anchored in the vehicle. For the load-indicating arrangement (25), the deformation of these anchoring members (21) is utilized in such manner that a deformation of the anchoring members (21), regardless of whether it is permanent or elastic, going beyond a certain measure blasts the signaling member (42) out of its rest position.

20 Claims, 4 Drawing Sheets

SAFETY NET SYSTEM WITH LOAD INDICATOR

FIELD OF THE INVENTION

The present invention relates to safety devices for automobiles, and more particularly to an improved safety net device for sealing off the luggage compartment or trunk space of an automobile from the passenger compartment.

BACKGROUND OF THE INVENTION

Even in station wagons with raised rear seats there is a continuous connection between the baggage space and the passenger space. Collisions bring about the danger that objects present in the trunk space will be flung into the passenger space and injure persons there. In order to prevent this, safety net arrangements are used which block off this opening.

Similar conditions prevail in the case of passenger cars in which the rear seat can be folded over in order to obtain an increased loading or baggage space. Here, too, safety nets are used which are to protect the people in the passenger space.

Even in the case of slight collisions, under some circumstances objects can fly out of the baggage space and against the safety net with relatively significant force. Although the safety net possibly suffers no directly perceptible damage, it is nevertheless pre-damaged by such an event. This prior damage raises the risk of failure of the safety net in the case of a later serious crash and the objects from the baggage space can no longer be held back.

OBJECTS AND SUMMARY OF THE INVENTION

Proceeding from this, it is an object of the invention to create a safety net arrangement with which after a crash it is signaled whether it is necessary to reckon with a prior damage of this safety net.

The present invention provides these and other advantages and overcomes the drawbacks of the prior art by providing a safety net device having a load or strain indicating arrangement which provides an indication of the damage caused by a crash.

With the novel safety net arrangement, a load or strain indicating arrangement is provided which has two signaling states. The first signaling state corresponds to the rest state which corresponds to the unburdened net. The other signaling state is the signaling state that occurs after the net was burdened with a predetermined force from which the risk of a prior damage to the net is no longer possible to exclude.

Preferably the change of the load indication from the rest state into the signaling state is irreversible, so that the recognizability remains present and cannot be suppressed.

The accommodation of the load indicating arrangement is made advantageously on a strut with which the safety net is to be anchored in the car body. Thereby there are yielded clear spatial relations and the danger of inadvertent damage is minimized. Furthermore, the load or stress display arrangement is directly visible in the field of vision during any handling of the safety net.

The load display arrangement can be accommodated relatively simply on one or both ends of the strut.

The load indicating arrangement can be combined in a very simple manner with means for the consumption of energy. These energy-consuming means, in the case of a relatively severe burdening of the safety net due to a severe collision, are to take up or absorb a part of the kinetic energy of the objects flung into the net and convert it into heat, so as to protect the safety net against tearing.

For actuating the load-indicating arrangement there can be used the connecting members with which the safety net is ordinarily anchored in the car body. These anchoring members are normally longitudinally moveable with respect to the strut, and in order to execute the load indicating arrangement, it usually is also possible to deflect them to an appreciable degree in transverse direction, therefore in the radial direction with respect to the strut. There the bending rigidity of the anchoring members is defined as the force limit from which the load indicating arrangement is released, i.e. changes in its signaling state.

The load-indicating arrangement advantageously contains a signaling member that can be moved back and forth between a rest position and a signaling position. On exceeding the critical load limit, the signaling member goes over into the signaling state.

The signaling member is preferably mounted swingably in the manner of a flag, so that after the releasing action it stands clearly visible in the space and cannot be inadvertently overlooked. Especially when the safety net is hung out the next time, the absent signaling member will catch the user's eye and make him realize that a replacement of the safety net arrangement is advisable because of the risk of prior damage.

This signaling member can be hinged on a strut or on a sleeve which belongs to the energy consuming means.

The strut is constructed in tubular form at least at its end, and at least on this end there is present a sleeve in which the anchoring member is seated longitudinally moveable. The sleeve is provided with a second portion extending externally, over the strut on which the signally member is swingably borne.

In order to actuate the signaling member, on that signaling member there is provided an actuation extension or continuation which extends into the interior of the sleeve and scans the anchoring member. So that no additional bores have to be made in the strut, the actuating member preferably is located in the vicinity of the outside-lying end of the sleeve.

In the rest position the signaling member is locked in place, the locking being irreversibly canceled in the change into the signaling state.

So that the signaling member will also stand out clearly in the signaling state, it is pre-stressed into the signaling position by means of a spring.

The actuating member is designed in such a way that it responds to a transverse movement of the anchoring member relative to the strut.

These and other features and advantages of the invention will be more readily apparent upon reading the following description of preferred exemplary embodiments of the invention and upon reference to the drawings wherein:

While the invention will be described and disclosed in connection with certain preferred embodiments and procedures, it is not intended to limit the invention to those embodiments. Rather it is intended to cover all such alternative embodiments and modifications as fall within the spirit and scope of the invention.

DETAILED DESCRIPTION OF PREFERRED EMBODIMENTS

Figure 1:
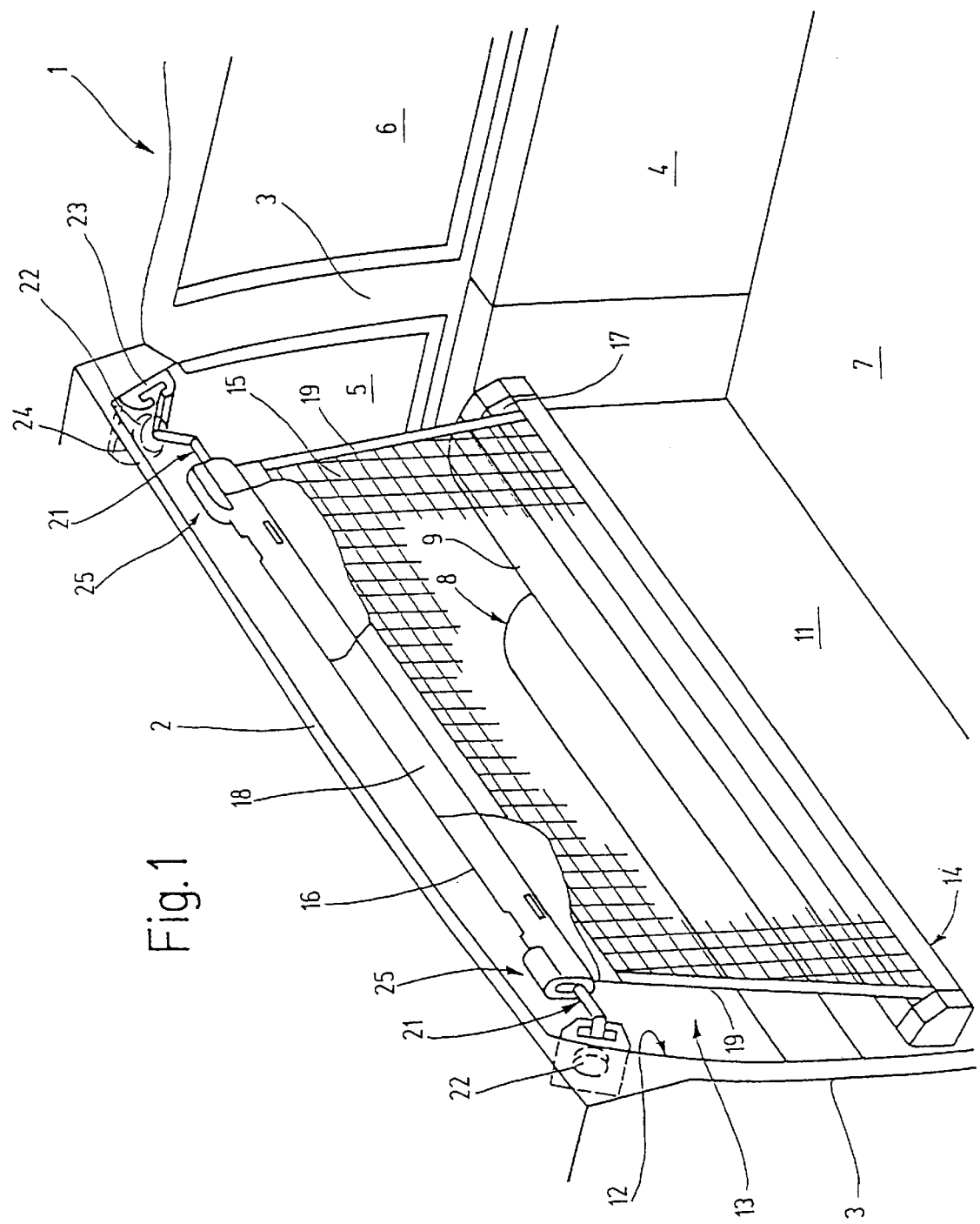
FIG. 1 is a perspective view of a partially cutaway vehicle showing an illustrative safety net spanned between the roof of a motor vehicle and the armrest.

FIG. 1 shows in exploded representation a rear portion 1 of a station wagon. The rear portion 1 is represented in perspective approximately as viewed from the missing left-hand side rear window, and it has a roof 2, which is borne laterally by two C-columns 3. In front of the C-column 3 there lies underneath the roof 2 and above a side wall 4 a rear side window 5, while behind the C-column 3 there is arranged a further rear side window 6. The arrangement of the side windows 5 and 6 is to be thought of in mirror image on the left side of the rear portion. The rear portion 1 is closed off below by a substantially level loading surface 7.

Between the two rear side windows 5 there is located, at the level of the C-columns 3, a rear seat 8, the rear backrest 9 of which is disposed with a rear side 11 approximately between the two C-columns 3.

Between the under-edge of the roof 2 and the upper edge of the rear seat rest 9 there is an opening 12, through which a passenger's space present in front of the rear seat rest 9 is in communication with the cargo space present behind it.

In order to prevent the possibility that in a crash objects will be thrown into the passenger space, the opening 12 is closed by a safety net arrangement 13. The safety net arrangement 13 includes a housing 14, a safety net 15 and a pull rod or strut 16 mounted on the safety net 15.

The housing 14 is an elongated, box-shaped housing which is provided on its upper side with an outlet slot 17 extending over its entire length. In the interior of the housing 14 there is rotatably borne in a known manner an imperceptible winding shaft, which is pre-tensioned by means of a spring motor, in the winding-up direction of the safety net 15. The housing 14 is detachably fastened to the rear side 11 of the rear seat back rest 9.

The safety net 15 is joined by one of its edges to the winding shaft and it moves, proceeding from the winding shaft, through the outlet slot 17 and out of the housing 14. The edge of the safety net that is parallel to the winding shaft is provided with a loop 18 which runs over the entire width of the approximately trapezoidal safety net 15.

In the interest of completeness, it is further mentioned at this point that the safety net 15 is reinforced on both its lateral edges by framing bands 19.

From the drawbar or strut 16 there project on both ends anchoring members 21 which have mushroom-shaped heads 22. The mushroom-shaped heads 22 are introduced, with the stretched safety net 15, into closed-end T-shaped grooves 23 of receiving pockets 24.

The receiving pockets 24 are located just beneath the lower edge 2 of the roof.

In the case of slight collisions it is possible that objects are flung out of the rear portion 1 in the direction of the passenger space. In this movement they are caught by the spanned safety net 15, which under some circumstances can be pre-damaged by this catching process in a manner not clearly recognizable, with the danger that it might fail in a later crash in which objects might again fly out of the cargo space and against the safety net 15. In order to preclude such a dangerous situation, the safety net arrangement 13 is additionally provided with two load indicating arrangements 25 which are located at both ends of the strut 16. The construction of the load indicating arrangement 25 is yielded from FIGS. 2 and 3, in which it is to be apparent, further, that the load indicating arrangement 25 is combined with means for a component which, in the event of a severe crash with very strong force, additionally serves to convert the kinetic energy of the parts flying into the safety net 15 into deformation energy. Thereby simultaneously the "braking path" for the parts flying against the net 15 is lengthened and the retardation peaks reach lower values.

Figure 2:
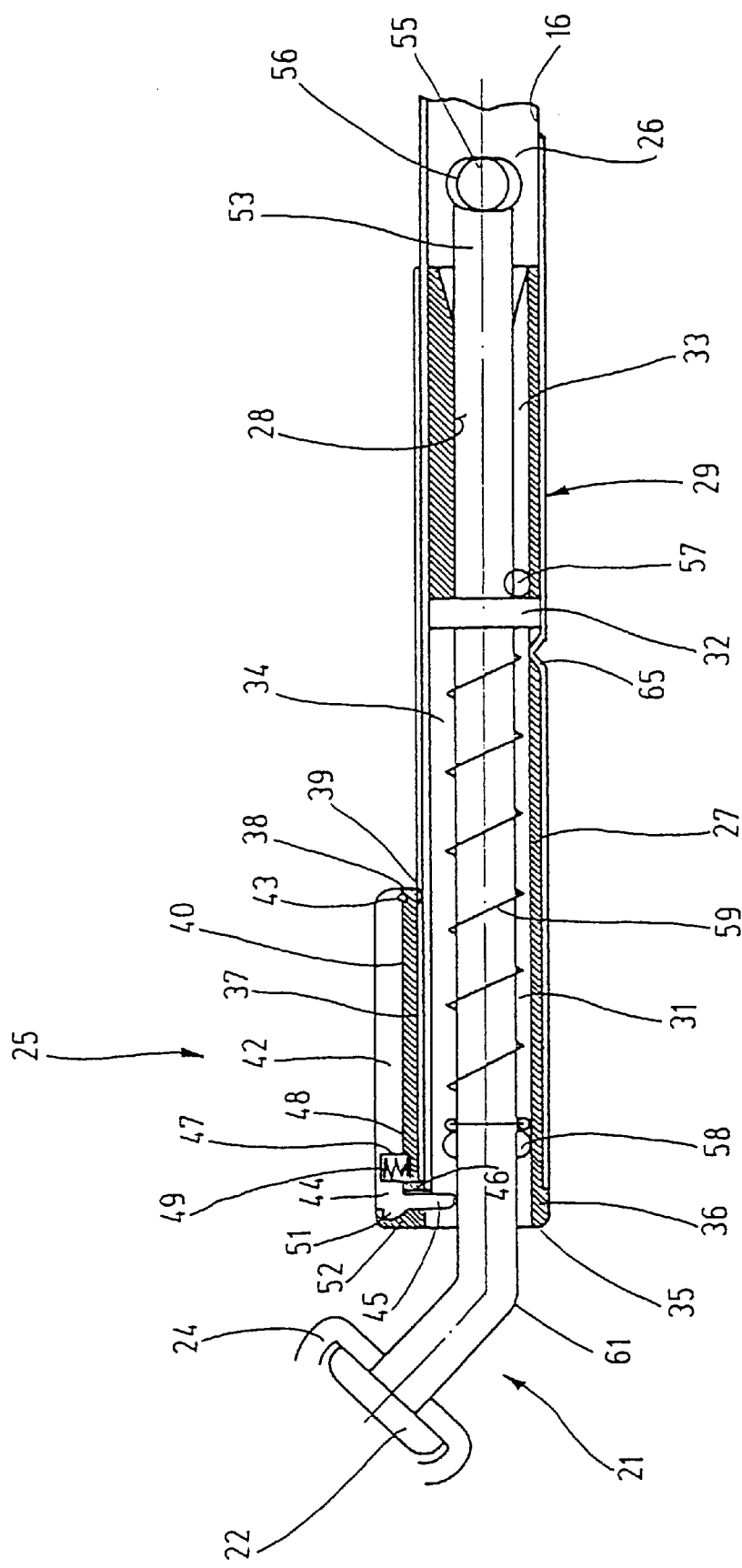
FIG. 2 is a longitudinal side sectional view showing an end of the fastening strut of the safety net according to FIG. 1.
Figure 3:
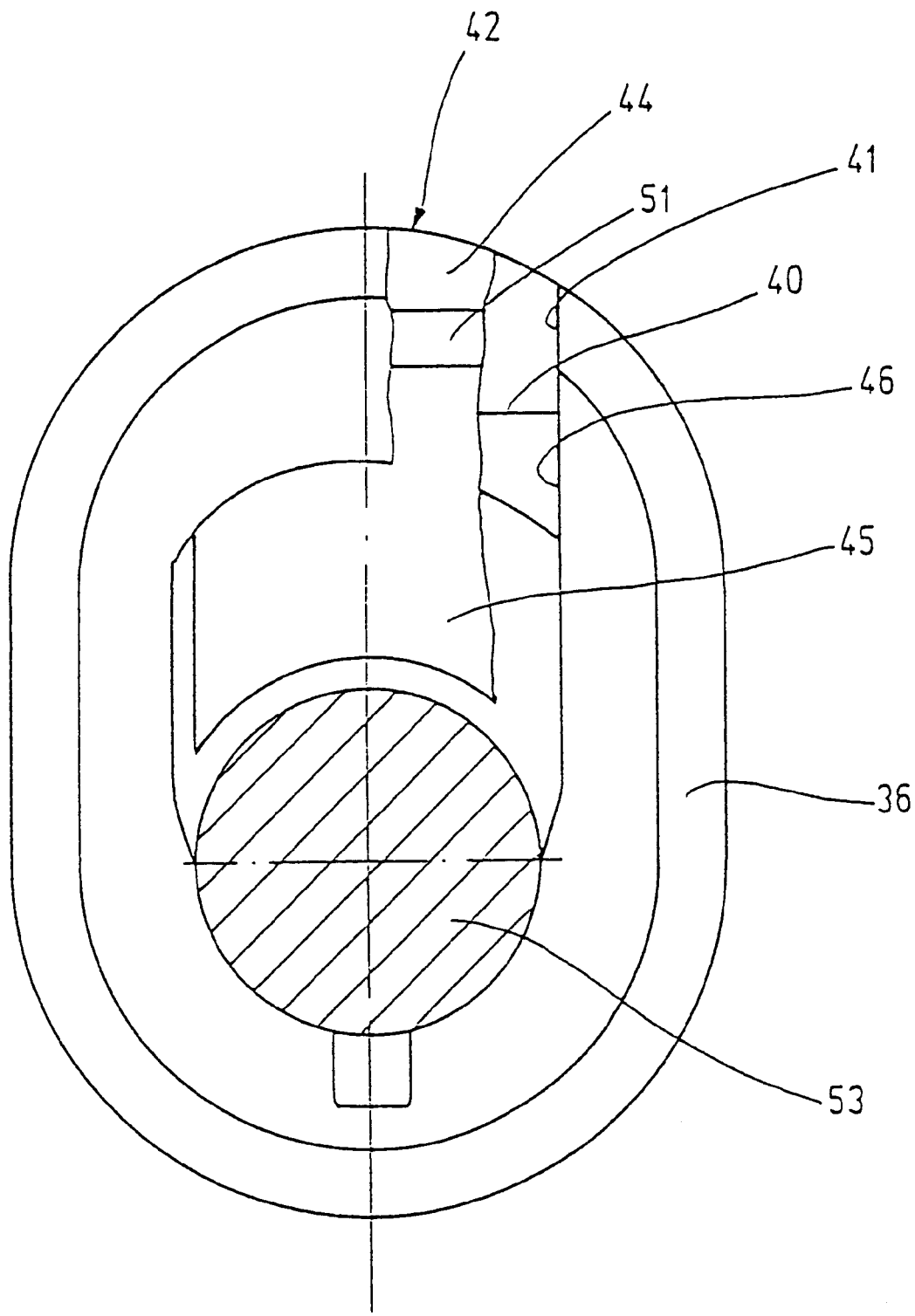
FIG. 3 is a partially cutaway front face view showing the fastening strut according to FIG. 2, with sectioned anchoring member.
Figure 4:
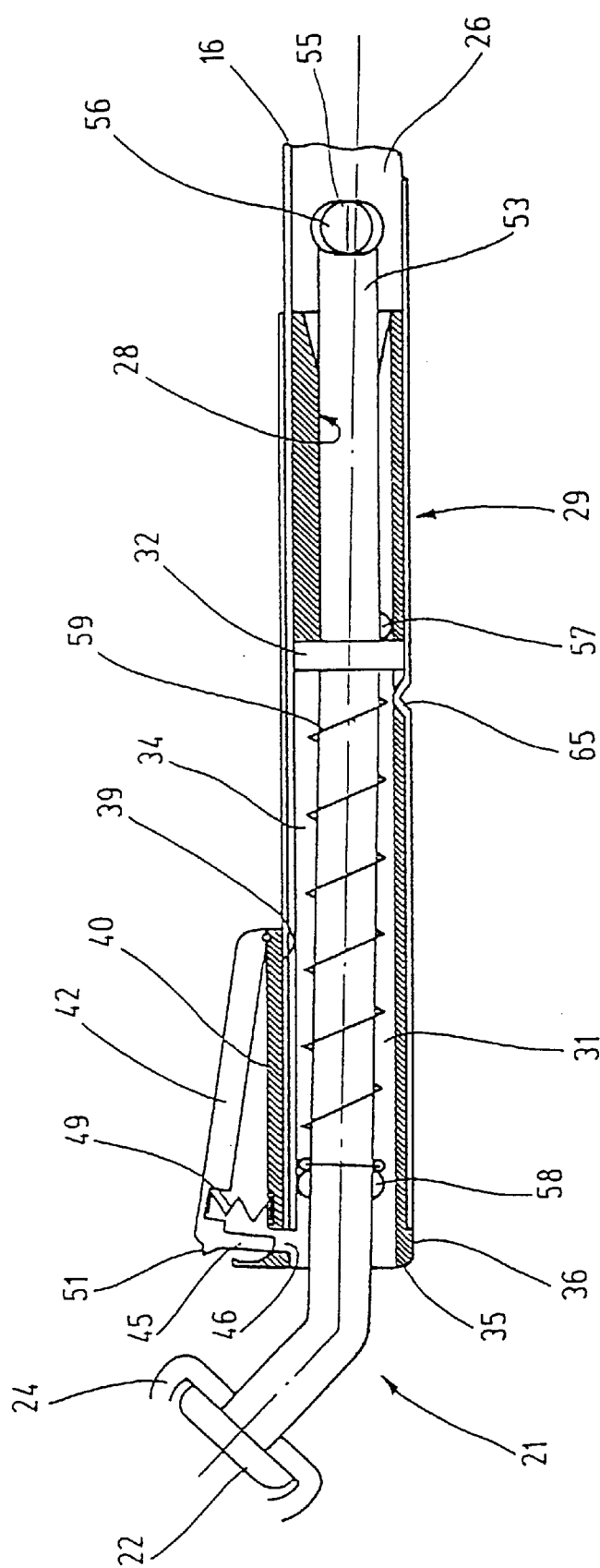
FIG. 4 is a longitudinal side sectional view showing the fastening strut according to FIG. 2 after the releasing of the signaling member.

In FIGS. 2 and 3, for example, the left end of the drawbar or strut 16 is illustrated. The other end of this drawbar 16 has a mirror image, for which reason the description given in the following holds also for the other end.

The strut 16 is formed by a metal tube which has a cylindrical cross section throughout and which presents a cylindrical interior space 26, which extends likewise over its entire length. From the illustrated end there is thrust into the interior space 26 a sleeve 27 consisting of plastic, which contains a bore 28 coaxial to the lengthwise axis of the strut 16 and is externally largely cylindrical.

The bore 28 is subdivided into two sections 29 and 31, in which at the transition point between the two sections 29 and 31, a steel ring 32 is inserted, which contains a bore with greater diameter coaxial to the bore 28, so that the plastic mass of the sleeve 27 can pass through the ring 32, in order to join the two sections 29 and 31 in material closure with one another.

The sleeve 27 is plugged inside the strut 16 in such manner that its section 29 faces the middle of the strut 16. In this section 29 the bore 28 contains a narrow groove 33 running straight through, which begins at the ring 32 and extends to the end of the section 29 lying away from the ring 32. The bore 28 has in the section 31 a somewhat greater diameter and, furthermore, it is slotted at 34 on the side facing upward in FIG. 2. This slot at 34 has a width corresponding approximately to the diameter of the bore 28 in the area of the section 29. It begins at the ring 32 and extends to a face surface 35 positioned away from the ring 32.

In the area of the face surface 35 the sleeve 27 forms a collar 36 overhanging the sleeve 27 in the radially outward direction, which collar is positioned with its shoulder in the mounted state bluntly on the face side of the strut 16.

On the outer-lying collar 36 a one piece lash-form extension 37 is formed, the end 38 of which points in the direction of the middle of the strut 16. The end 38 is arranged in spaced relation from the ring 32.

The extension 37 has an underside 39, which rests on the outer side of the strut 16 and is correspondingly contoured in graduated circle form. Opposite the underside 39 there runs an upper side 40 which is essentially flat.

From the upper side 40 two side walls 41 proceed on the extension 37, which because of the sectioned representation, are not shown in FIG. 2; in FIG. 3 one of the side walls 41 is shown. These walls extend from the collar 36 to the end 38 and they bound, together with the upper side 41, a groove having a rectangular cross section. In this groove there is arranged in the rest state a flag-shaped or flap-type signaling member 42. The signaling member 42 is joined at the end 38 over a hinge 43 with the extension 37. This hinge 43 can be a film hinge if the signaling member 42 is joined to form one piece with the extension 37, or it can be configured as a hinge with pivots which engage into corresponding cups, which in turn, depending on position, are formed either in the side walls 41 of the extension 37 or in those of the signaling member 42.

The signaling member 42 has a cross section shape that is adapted to the cross section shape of the groove on the upper side 41 of the extension 37, so that there is yielded a smooth surface between the side walls 41 of the extension 37.

The signaling member 42 has a front end 44 which is located in front of the face surface of the tube 16. On this front end there is molded an operating member 45 in the form of a one-piece arm-shaped extension. This operating member 45 extends through an adapted opening 46 in the outer circumferential surface of the sleeve 27 and, namely, at a point which is located immediately in front of the face side of the strut 16.

As the figure makes evident, the operating member 45 extends in the rest state into the gap or slot 34 of the sleeve 27. The length of the actuating member 45 is yielded from the following functional description.

In blind bores 47 and 48 which are formed in the upper side 40 of the extension 37 and in the underside of the signaling member 42 there is seated a pressure spring 49 which tensions the signal member 42 in the direction away from the extension 37. In order to hold the signaling member 42 fast against the action of the spring 49 on the upper side 40, a rest lug 51 is present, which engages into a complementary rest recess 52 which is located in the radial extension of the shoulder of the collar 36 or its rear side, and therefore in front of the front end 44 of the signaling member 42.

As already mentioned above, the load indicating arrangement 25 is a component in common with the means that serve, in the event of a crash, to convert the kinetic energy of the objects flung into the safety net 15 into deformation energy or heat. In order to achieve this the anchoring member 21 is provided with a cylindrical rod-shaped shaft 53 which runs through the bore 28 of the sleeve 27. Its inside-lying end 55 is thickened by the squeezing-on of laterally projecting ears or latches 56. Further, at a distance from the end 55, at point 57, there is a further latch or an ear that is squeezed on and which projects into the groove 33 and that, together with this groove 33, acts as a safeguard against twisting, so that shaft 53 cannot twist with respect to strut 16.

The shaft 53 of the anchoring member 21 is guided in the bore section 29 with a little play so that it cannot come to be positioned without deformation on the actuating member 45.

Two further ears or latches 58 are squeezed still within the sleeve 27 shortly before its face surface 35. They serve as counter-support for a screw pressure spring 59, which is supported at its other end on the steel ring 32 or on a shoulder present in this area, which constitutes the transition between the section 31 of the bore 28 and its section 29. With the aid of this spring 59 the anchoring member 21 is pre-stressed into the thrust-forward position, out of the strut 16, until the squeezed on latch 57 lies on the inside lying rear side of the steel ring 32.

Outside of the sleeve 27, the shaft 53 is bent off at 61 and it carries on its outside positioned free end the already mentioned mushroom head 22.

In order to secure the sleeve axially in the strut, in the mounted position a bead 65 is impressed into the strut 16, which engages into a groove formed in the outside of the sleeve 27.

Even though the dimensions of the above-mentioned components are not already clear on the basis of the description, they are yielded from the following description of the functioning of the load indicating arrangement 25.

In the normal or rest position, the load signaling members 42 of the load-indicating arrangement, that are present on the two ends of the strut 16, lie flat and do not project over the side walls 41 of the extension 37. The handling of the safety net arrangement 13 is as usual—i.e. for the bounding of the loading space with respect to the passenger space—on the strut 16, against the action of the spring motor which engages on the winding shaft, the safety net 13 is drawn out of the outlet slot 17 until the two anchoring members 21 with the mushroom heads 22 are suspended in the receiving pockets 24.

If a vehicle equipped in such manner travels frontally against an obstacle, stopping forces arise which cause the objects present in the loading space to fly forward against the safety net 15. In the case of slight collisions with lesser retardations small forces arise.

If the forces are too small for any damage to be done, there occurs no bending of the shaft 53 of the anchoring members 21. The anchoring members 21 are guided in the bore section 29 in such manner that, by reason of the arising bending force they cannot yet come to lie on the operating members 45, with their outer end in the vicinity of the bend 61. This operating member runs, in the rest state, with a slight spacing from the circumferential surface of the shaft 53, and namely so that by reason of the necessary play that the shaft 53 has in the bore 28, no contact can come about between parts of the anchoring member 21 and the operating member 45.

Retardations that bring about a contact between objects in the loading space and the safety net 15, and that are small enough, do not consequently release the load indicating arrangement 25. If, however, greater retardation values occur—i.e. the objects press with greater force against the safety net 15—then corresponding great breaking and bending forces are transferred from the strut 16 onto the shaft 53, over the section 29 of the bore 28.

These forces can be too small to cause the energy absorbing means to respond and neither do they lead yet to a bending of the strut 16. Nevertheless, these forces can be so great that they pre-damage the textile safety net 15 in an unrecognizable manner. In order to detect this and to make it visible to the user, there is provided the load indicating arrangement 25.

Since the shaft 53 is not guided in the area between the steel ring 32 and the face surface 35 in a direction parallel to the bending forces occurring in the sleeve 27, because in this area the bore 28 goes over into the slot 34, the shaft 53, as FIG. 3 shows, will bend beyond the steel ring 32 (the forces that are caused by the objects act, with reference to FIG. 2, in a downward direction). By reason of this bending, which can be permanent or elastic, at any rate with sufficient amplitude the outside of the shaft 53 will come to be positioned on the free end of the actuating member 45, and will press the actuating member 45 radially away with respect to the shaft 53. The force arising there is so great that the locking of the lug 51 in the rest recess 52 cannot prevent the movement, and the rest recess breaks off upward with respect to FIG. 2.

Under the action of the pre-tensioning spring 59, the signaling member 42 hinges out of the position in which it lies essentially parallel to the strut 16, as FIG. 3 makes evident. Thereby it is signaled to the user that through the collision the safety net 13 also was damaged and a replacement is required.

As is yielded from the specification, the bending rigidity of the shaft 53 sets the value of the force acting on the safety net 15, above which the load indicating arrangement 25 is released.

In collisions with still stronger retarding effect finally the strut 16 also will bend along more or less strongly, and the force of the objects pushing against the safety net 15 tends to bring down this strut 16 from the shaft 53 of the particular anchoring member 21. In this movement, first of all the lash 57 on the ring 32 is sheared off. The further movement leads to the result that the thickened end 55 of the shaft 53 forces its way into the bore 28 and in so doing widens it. Hereby the kinetic energy is converted into deformation energy of the sleeve 27 or of the strut 16 binding it externally. This is to be learned in detail, for example, from German Patent 43 36 380.

So that in this deformation the sleeve 27 cannot slip out of the strut 16, the bead 50 is impressed onto the strut 16, which is located in front of the face side of the steel ring 32 which faces the outer end of the strut 16. So that the pressing in of the bead 50 cannot lead to a deformation of the bore 28, the sleeve 27 is provided at this point with a corresponding circumferential groove.

A safety net arrangement is provided with a load indicating arrangement in order to signal to the user that forces have acted on the safety net which possibly can lead to a prior damage. The load indicating arrangement acts together with the anchoring members with which the front edge of the safety net is to be anchored in the vehicle. For the load indicating arrangement the deformation of these anchoring members is utilized in such manner that a deformation of the anchoring members going beyond a certain measure, regardless of whether it is permanent or elastic, will blast a signaling member out of its rest position.

What is claimed is:

1. A safety net assembly for protecting an opening between a passenger space and a cargo space of a motor vehicle, the safety net comprising in combination:
   a safety net operable in a stretched state to close the opening between the cargo space and the passenger space,
   a fastening assembly carried by the safety net for connecting the safety net with receptacles provided in sides of the opening between the cargo space and the passenger space, and
   a load-indicating mechanism having at least a first and a second indicating state, the load indicating mechanism being operable to change from the first indicating state to the second indicating state when a force exceeding a predetermined force acts on the safety net.

2. The safety net assembly according to claim 1, wherein the fastening assembly includes at least one strut provided on an edge of the safety net, two anchoring members being arranged on the strut for suspending the safety net into the receptacles.

3. The safety net assembly according to claim 1, wherein the load-indicating mechanism is adapted such that its change from the first state into the second state is irreversible.

4. The safety net assembly according to claim 2, wherein the load-indicating mechanism is arranged on the strut.

5. The safety net assembly according to claim 2, wherein the strut has two ends and the load-indicating mechanism is arranged on one end of the strut.

6. The safety net assembly according to claim 2, wherein the strut has two ends and a load-indicating mechanism is arranged on each end of the strut.

7. The safety net assembly according to claim 1 further including at least one energy-consuming mechanism.

8. The safety net assembly according to claim 7, wherein the energy-consuming mechanism is integrated with the load-indicating mechanism into a single component.

9. The safety net assembly according to claim 2, wherein the load-indicating mechanism includes at least one anchoring member.

10. The safety net assembly according to claim 2, wherein at least one of the anchoring members is longitudinally movable with respect to the strut and transversely movable in a limited manner with respect to the strut.

11. The safety net assembly according to claim 1, wherein the load-indicating arrangement includes a signaling member movable between a first and second position, the signal member being in the first position before a load on the safety net exceeds the predetermined force and changing into the second position after a load on the safety net has exceeded the predetermined force.

12. The safety net assembly according to claim 11, wherein the signaling member swings between the first and second positions.

13. The safety net assembly according to claim 11, wherein the signaling member is pre-tensioned towards the second position.

14. The safety net assembly according to claim 11 wherein the signaling member is carried on the strut.

15. The safety net assembly according to claim 14, wherein at least one end of the strut has a tubular configuration, and the load-indicating mechanism has a sleeve insertable in the tubular end of the strut and includes a section which externally overhangs the strut and on which the signaling member is carried.

16. The safety net assembly according to claim 15, further including at least one energy-consuming mechanism which includes the sleeve.

17. The safety net assembly according to claim 16, wherein the sleeve carries an extension having a locking system into which the signaling member is snapped in the first position.

18. The safety net assembly according to claim 17, wherein the locking system is adapted such it is mechanically destroyed when the signaling member moves into the second position.

19. The safety net assembly according to claim 11, wherein the signaling member includes an actuating member which is arranged to sense movement of a corresponding anchoring member.

20. The safety net assembly according to claim 19, wherein the actuating member is adapted such that it responds to a transverse movement of the corresponding anchoring member relative to the strut.

* * * * *